United States Patent [19]

Williams

[11] Patent Number: 5,132,902
[45] Date of Patent: Jul. 21, 1992

[54] METHOD FOR AUTOMATED PROCESS DELAY WITHIN A DATA PROCESSING SYSTEM

[75] Inventor: Marvin L. Williams, Lewisville, Tex.

[73] Assignee: International Business Machines Corporation, Armonk, N.Y.

[21] Appl. No.: 515,373

[22] Filed: Apr. 27, 1990

[51] Int. Cl.⁵ .............................................. G06F 15/38
[52] U.S. Cl. ................................................... 364/419
[58] Field of Search ................ 364/419, 200 MS File, 364/900 MS File, 518, 408, 403

[56] References Cited

U.S. PATENT DOCUMENTS

| | | | |
|---|---|---|---|
| 4,807,154 | 2/1989 | Scully et al. | 364/518 |
| 4,817,018 | 3/1989 | Cree et al. | 364/518 |
| 4,899,299 | 2/1990 | MacPhail | 364/518 |

Primary Examiner—Dale M. Shaw
Assistant Examiner—Xuong Chung
Attorney, Agent, or Firm—Andrew J. Dillon

[57] ABSTRACT

A method is disclosed for automating a selected delay within a data processing procedure. A desired deferral time is specified and associated with a particular document or process within a data processing system. Thereafter, the occurrence of the desired deferral time results in the automated processing of the associated document by the system. In one embodiment of the present invention a user may specify a particular date and time after which a response to a particular document is desired. The desired deferral time is then associated with the particular document in a distribution profile and utilized to either prompt a recipient to respond after the elapse of the specified time or to automatically defer the transmission of the recipient's response until the desired time. Similarly, a user may utilize this technique to chronologically order the fan out distribution of a document by transmitting a list of desired addressees and an associated desired deferral time for each such addressee to a transmission service. Thereafter, as each desired deferral time elapses the document will automatically be transmitted by the transmission service to an associated addressee.

10 Claims, 3 Drawing Sheets

METHOD FOR AUTOMATED PROCESS DELAY WITHIN A DATA PROCESSING SYSTEM

BACKGROUND OF THE INVENTION

1. Field of the Invention

The present invention relates in general to the field of data processing systems and in particular to the field of automating the performance of selected processes within a data processing system. Still more particularly, the present invention relates to an improved method for automating the deferred performance of selected procedures within a data processing system.

2. Description of the Prior Art

The advent of powerful data processing systems has lead to an increasing amount of automation of processes which once required extensive human intervention. For example, it is not uncommon for long and complex data processing procedures to be initiated and run for long periods of time without requiring a computer user to periodically control the process.

However, a problem which continues to exist in even the most modern computer systems is centered in the fact that it is often necessary or desirable for a program or document to be initiated or transmitted at a time which is inconvenient for the computer user. Similarly, a process which requires multiple initiations over a period of time cannot be easily automated to reduce the amount of human intervention which is necessary.

It should therefore be apparent that a need exists for a method whereby a process or document may be automated to the extent that selected procedures may be initiated or transmitted automatically upon the occurrence of a selected deferral time.

SUMMARY OF THE INVENTION

It is therefore one object of the present invention to provide an improved data processing method.

It is another object of the present invention to provide an improved data processing method which permits the automation of selected data processing procedures.

It is yet another object of the present invention to provide an improved data processing method which permits the automating of deferred performance of selected procedures within a data processing system.

The foregoing objects are achieved as is now described. A desired deferral time is specified and associated with a particular document or process within a data processing system. Thereafter, the occurrence of the desired deferral time results in the automated processing of the associated document by the system. In one embodiment of the present invention a user may specify a particular date and time after which a response to a particular document is desired. The desired deferral time is then associated with the particular document in a distribution profile and utilized to either prompt a recipient to respond after the elapsing of the specified time or to automatically defer the transmission of the recipients response until the desired time has occurred. Similarly, a user may utilize this technique to chronologically order the fan out distribution of an electronic document by transmitting a list of the desired addressees and an associated desired deferral time for each such addressee to a transmission service. Thereafter, as each desired deferral time elapses the document is automatically transmitted to an associated addressee.

The above as well as additional objects, features, and advantages of the invention will become apparent in the following detailed description.

BRIEF DESCRIPTION OF THE DRAWING

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
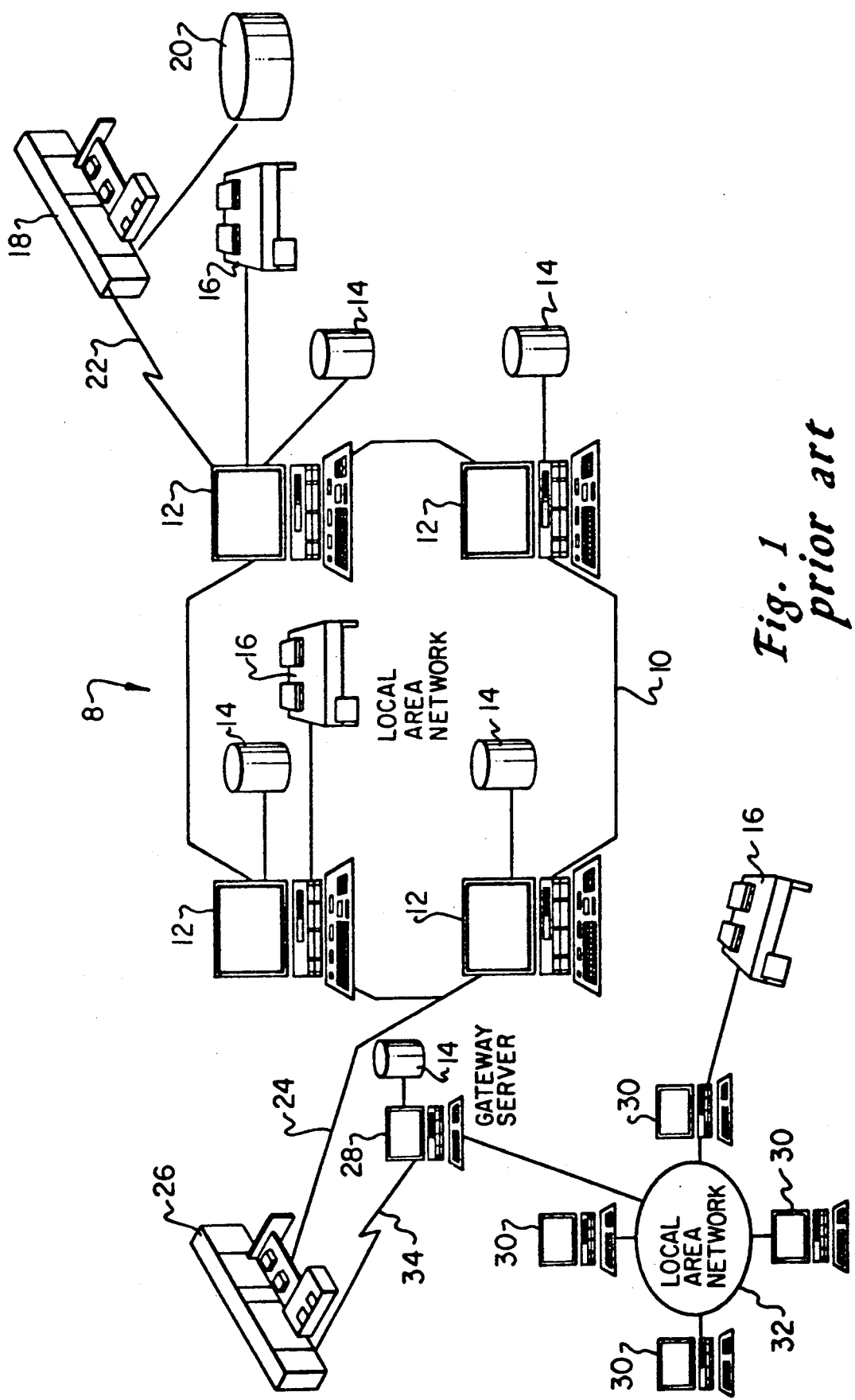
FIG. 1 is a pictorial representation of a distributed data processing system which may be utilized to implement the method of the present invention.

With reference now to the figures and in particular with reference to FIG. 1, there is depicted a pictorial representation of a data processing system 8 which may be utilized to implement the method of the present invention. As may be seen, data processing system 8 may include a plurality of networks, such as Local Area Networks (LAN) 10 and 32, each of which preferably includes a plurality of individual computers 12 and 30, respectively. Of course, those skilled in the art will appreciate that a plurality of Intelligent Work Stations (IWS) coupled to a host processor may be utilized for each such network.

As is common is such data processing systems, each individual computer may be coupled to a storage device 14 and/or a printer/output device 16. One or more such storage devices 14 may be utilized, in accordance with the method of the present invention, to store the various data processing procedures or documents which may be periodically accessed by a user within data processing system 8, and automated in a deferred manner in accordance with the method of the present invention. In a manner well known in the prior art, each such data processing procedure or document may be stored within a storage device 14 which is associated with a Resource Manager or Library Service, which is responsible for maintaining and updating all resource objects associated therewith.

Still referring to FIG. 1, it may be seen that data processing network 8 may also include multiple mainframe computers, such as mainframe computer 18, which may be preferably coupled to Local Area Network (LAN) 10 by means of communications link 22. Mainframe computer 18 may also be coupled to a storage device 20 which may serve as remote storage for Local Area Network (LAN) 10. Similarly, Local Area Network (LAN) 10 may be coupled via communications link 24 through a subsystem control unit/communications controller 27 and communications link 34 to a gateway server 28. Gateway server 28 is preferably an individual computer or Intelligent Work Station (IWS) which serves to link Local Area Network (LAN) 32 to Local Area Network (LAN) 10.

As discussed above with respect to Local Area Network (LAN) 32 and Local Area Network (LAN) 10, a plurality of data processing procedures or documents may be stored within storage device 20 and controlled by mainframe computer 18, as Resource Manager or Library Service for the data processing procedures and documents thus stored. Of course, those skilled in the art will appreciate that mainframe computer 18 may be located a great geographical distance from Local Area Network (LAN) 10 and similarly Local Area Network (LAN) 10 may be located a substantial distance from Local Area Network (LAN) 32. That is, Local Area Network (LAN) 32 may be located in California while Local Area Network (LAN) 10 may be located within Texas and mainframe computer 18 may be located in New York.

In known prior art systems of this type it is common for a user in one area of distributed data processes system 8 to transmit a process or document to a second user within a different portion of distributed data processing 8. Within the textual content of a document transmitted in this manner it is also common for one user to specify to a second user that a response is desired not later that a particular time; however, there exists no current procedure whereby a user may automatically defer the transmittal of such a document or the receipt of a response from the recipient until the occurrence of a specified deferral time.

It should therefore be apparent that it would be very helpful to have a system whereby a delay for a particular procedure or document may be automated within the data processing system, thereby greatly enhancing the efficiency of the data processing system.

Figure 2:
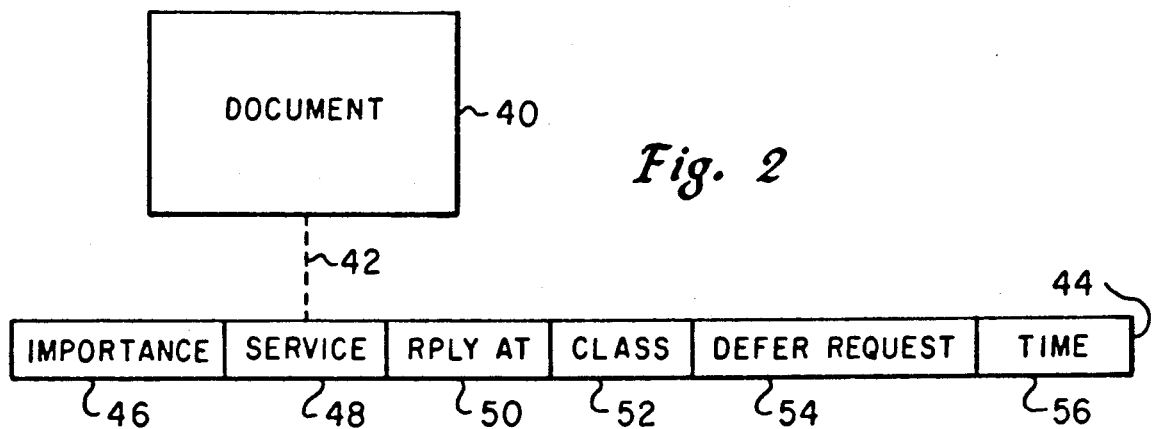
FIG. 2 is a graphic depiction of a distribution profile which may be utilized to implement the method of the present invention.

Referring now to FIG. 2, there is depicted a graphic representation of a distribution profile which may be utilized to implement the method of the present invention. As is illustrated, a document 40 is depicted along with a distribution profile 44. Distribution profile 44 is preferably stored in association with document 40 and linked thereto via reference 42. Those skilled in the art will appreciate that reference 42 may comprise a flag or other reference stored within document 40.

As is illustrated, distribution profile 44 preferably includes multiple fields of information which may be utilized to characterize the distribution of document 40. Although multiple specific fields are depicted within FIG. 2 several of these fields are illustrative in nature and those skilled in the art will appreciate that additional fields or different fields may be utilized without departing from the spirit of the present invention.

As is depicted in FIG. 2, distribution profile 44 includes a field 46 which may be utilized to indicate the importance of document 40. Field 48 similarly may be utilized to indicate the type of service which may be utilized with document 40 and field 50 preferably indicates the attributes of the type of reply which is required for document 40.

Field 52 within distribution profile 44 may be utilized to indicate a classification for document 40, either a security classification or delivery classification, as desired by the system operator. Next, in accordance with an important feature of the present invention, field 54 within distribution profile 44 may be utilized to indicate whether or not document 40 has a deferred request associated therewith. That is, whether or not the user specifying document 40 has requested that the transmittal or processing of document 40 be deferred until the occurrence of a specified deferral time. Finally, field 56 within distribution profile 44 may be utilized to specify the date and time associated with the deferral request contained within field 54. That is, the user specifying document 40 may also specify within distribution profile 44 a specific date and time the occurrence of which will automatically process or distribute document 40.

Figure 3:
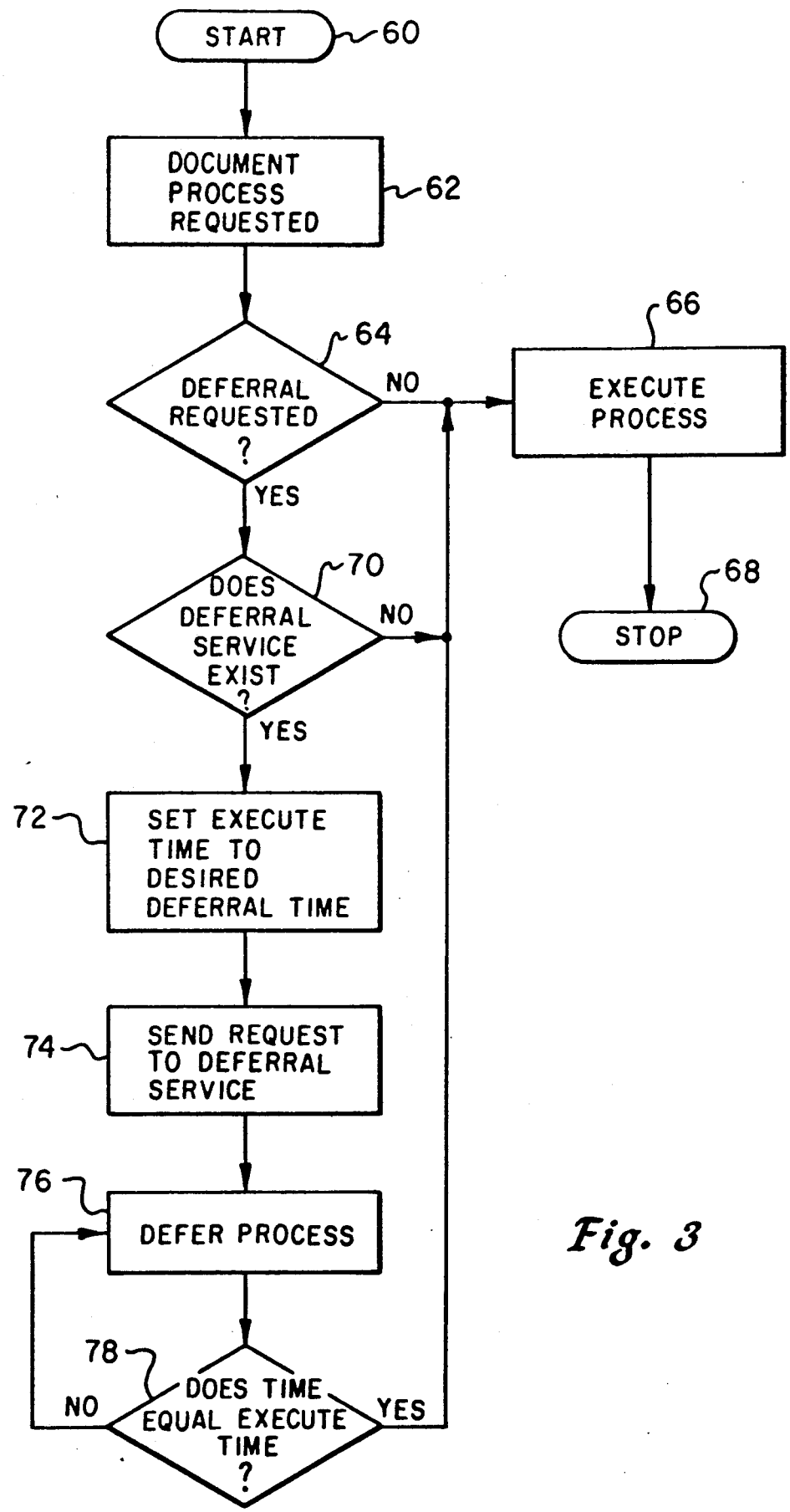
FIG. 3 is a logic flowchart depicting the deferral of an electronic document process by means of the method of the present invention.

With reference now to FIG. 3, there is depicted a logic flowchart illustrating the deferral of an electronic document process by means of the method of the present invention. As is depicted, the process begins at block 60 and thereafter passes to block 62 which illustrates the requesting of a document process. As utilized herein the term "document" shall mean a document or data processing procedure and the term "process" shall mean the actual processing of that procedure or the transmission of a document from one point of the data processing system to another location therein. Next, block 64 illustrates a determination of whether or not a deferral of the process has been requested and if not, block 66 illustrates the execution of that process. Thereafter, the procedure terminates, as illustrated in block 68.

However, in the event the determination illustrated in block 64 indicates that a deferral of the requested process has been requested, then block 70 illustrates a determination of whether or not an appropriate deferral service exists. Those skilled in the art will appreciate that the mere requesting of a deferral of a process will not be effective to defer that process unless the service or Resource Manager includes a procedure which will recognize the deferral request. In the event a deferral service does not exist then the process again returns to block 66 wherein the process is executed and thereafter the procedure terminates, as illustrated in block 68.

In the event a deferral of the requested process has been requested and a deferral service does exist, as determined in blocks 64 and 70, then block 72 depicts the setting of the execute time for the process in question to the desired deferral time. That is, the time at which the deferred process requested will automatically be executed by the system is set equal to the desired deferral time specified in the distribution profile (see FIG. 2). Next, as depicted in block 74 the request is transmitted to the deferral service. Block 76 next illustrates the deferring of the process. Finally, block 78 illustrates a determination of whether or not the current time is equal to the execute time and if not, the process returns iteratively to block 76 to await the point at which the current time will equal the execute time. At the point when the current time equals the execute time the process returns to block 66, wherein the requested process is executed. Thereafter, the process terminates as illustrated in block 68.

Upon reference to the foregoing those skilled in the art will appreciate that by establishing a deferral service in accordance with the method of the present invention a computer user may specify any process associated with a data processing procedure or document and defer the execution of that process until a specified deferral time has occurred. In this manner, a computer user may automate the chronologically ordered fan out distribution of a document by requesting transmittal of that document to a plurality of recipients while specifying desired deferral times for each recipient thus listed. In this manner the service may be utilized to automatically initiate transmittal of the specified document to each of the plurality of recipients at the deferral time requested by the transmitter. Similarly, the document process requested may simply be the transmittal of a response from the recipient of the document. In such a situation, a recipient who replies to a document which has been transmitted prior to the occurrence of the requested deferral time will find his or her reply being automatically deferred until the requested deferral time has occurred. Thereafter, the transmission service associated with the recipient will, in accordance with the method of the present invention, automatically transmit the reply in question to the originator of the document.

In this manner the transmission of a document by an original transmitter of a document or the transmission of a response by a recipient of a document may be automatically and efficiently deferred until the occurrence of a specified elapsed time. This technique permits the data processing system to accurately and efficiently order the procedure whereby documents are transmitted or responses to documents are received by a document originator.

Figure 4:
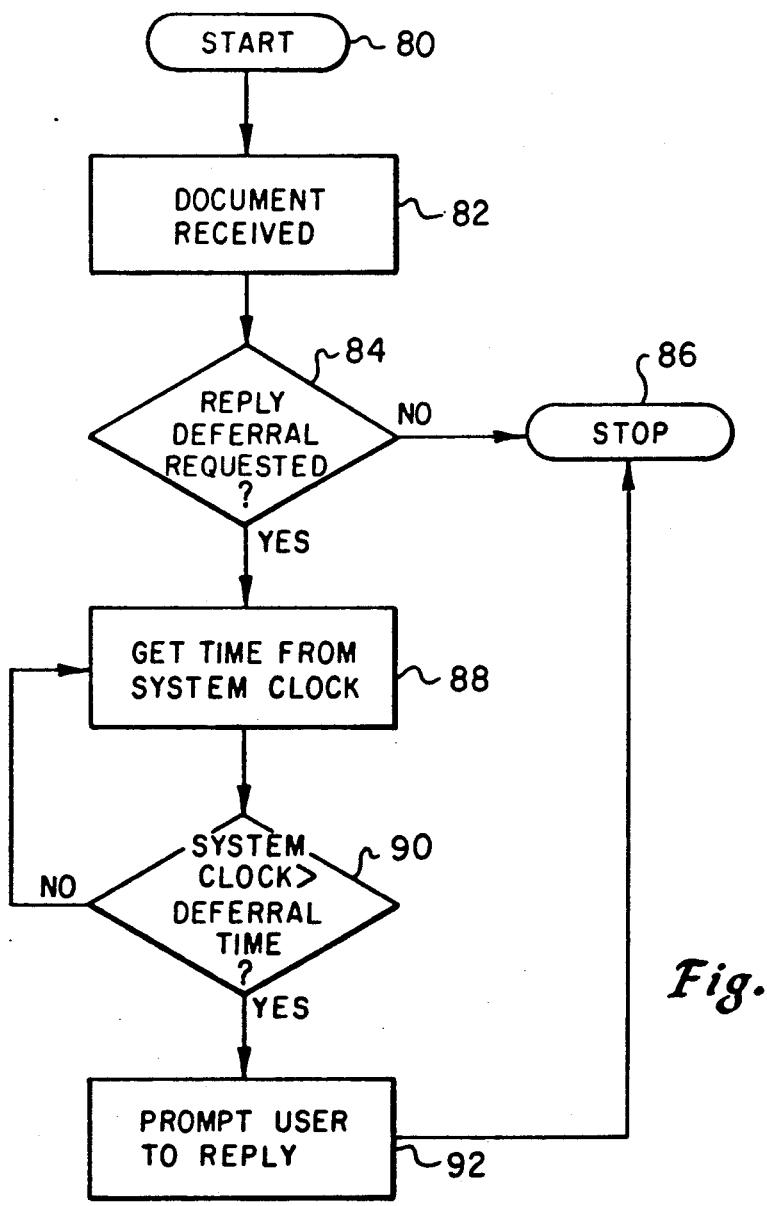
FIG. 4 is a logic flowchart depicting the automated prompting of a deferred response to a document in accordance with the method of the present invention.

Referring now to FIG. 4, there is depicted a logic flowchart illustrating the automated prompting of a desired response to a document in accordance with the method of the present invention. This technique is similar in nature to the method depicted within FIG. 3; however, it is specific in application to the prompting of a response from a recipient of a document transmitted within the data processing system.

As is illustrated, this process begins at block 80 thereafter passes to block 82 which illustrates the receipt of a document. Next, block 84 illustrates a determination of whether or not a reply deferral has been requested and if not, the process passes to block 86 and terminates.

In the event the determination depicted within block 84 indicates that a reply deferral has been requested, then block 88 illustrates the retrieval of the current time from the system clock. Next, block 90 illustrates a determination of whether or not the requested deferral time has elapsed. If not, the process returns iteratively to block 88 to once again determine the current time from the system clock. However, in the event the requested deferral time has elapsed, the process passes to block 92 which illustrates the prompting of the user to reply to the document previously received. Thereafter, the process returns to block 86 and terminates, as previously illustrated.

Upon reference to the foregoing to those skilled in the art will appreciate that the applicant has disclosed a method whereby a specified deferral time may be associated with a document or process and the processing of that document may be automatically deferred and then automatically initiated upon the occurrence of the specified deferral time. In this manner, the transmission of a document, a reply to that document or the prompting of a recipient to reply to a document may be automatically deferred until a selected time and thereafter initiated by the data processing system without the necessity of human intervention.

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. It is therefore contemplated that the appended claims will cover any such modifications or embodiments that fall within the true scope of the invention.

What is claimed is:

1. A method in a distributed data processing system for automating the transmittal of a document via a transmission service within said distributed data processing system to a plurality of recipients, said method comprising the steps of:
   identifying a document for transmittal via said transmission service within said distributed data processing system;
   identifying said plurality of recipients;
   specifying a desired deferral time associated with each of said plurality of recipients;
   transmitting said identified document and said specified desired deferral time for each of said plurality of recipients to said transmission service within said distributed data processing system; and
   thereafter, automatically transmitting said identified document via said transmission service to each of said plurality of recipients upon an elapse of said desired deferral time associated with each of said plurality of recipients wherein said transmission of said document to each of said plurality of recipients is chronologically ordered.

2. The method in a distributed data processing system for automating the transmittal of a document via a transmission service within said distributed data processing system to a plurality of recipients according to claim 1, further including the step of storing said desired deferral time associated with each of said plurality of recipients in association with said identified document.

3. The method in a distributed data processing system for automating the transmittal of a document via a transmission service within said distributed data processing system to a plurality of recipients according to claim 2, further including the step of storing said desired deferral time associated with each of said plurality of recipients within a distribution profile stored in association with said identified document.

4. A distributed data processing system for automating the transmittal of a document via a transmission service within said distributed data processing system to a plurality of recipients, said distributed data processing system comprising:
   means for identifying a document for transmittal via said transmission service within said distributed data processing system;
   means for identifying said plurality of recipients;
   means for specifying a desired deferral time associated with each of said plurality of recipients;
   means for transmitting said identified document and said specified desired deferral time for each of said plurality of recipients to said transmission service within said distributed data processing system; and
   means for thereafter automatically transmitting said identified document via said transmission service to each of said plurality of recipients upon an elapse of said desired deferral time associated with each of said plurality of recipients wherein said transmission of said document to each of said plurality of recipients is chronologically ordered.

5. The distributed data processing system for automating the transmittal of a document via a transmission service within said distributed data processing system to a plurality of recipients according to claim 4, further including means for storing said desired deferral time associated with each of said plurality of recipients in association with said identified document.

6. The distributed data processing system for automating the transmittal of a document via a transmission service within said distributed data processing system to a plurality of recipients according to claim 5, further including means for storing said desired deferral time associated with each of said plurality of recipients within a distribution profile stored in association with said identified document.

7. A method in a distributed data processing system for automatically deferring a response from a recipient of a document transmitted to said recipient via said distributed data processing system, said method comprising the steps of:
   identifying a document for transmittal via said distributed data processing system;
   specifying a desired deferral time;
   transmitting said identified document and said desired referral time to a selected recipient within said distributed data processing system;
   automatically deferring an attempted response to said identified document from said selected recipient prior to an elapse of said desired deferral time; and
   thereafter automatically transmitting said deferred response to said identified document from said selected recipient upon an elapse of said desired deferral time.

8. The method in a distributed data processing system for automatically deferring a response from a recipient of a document transmitted to said recipient via said distributed data processing system according to claim 7, further including the step of storing said desired deferral time in association with said identified document.

9. A distributed data processing system for automatically deferring a response from a recipient of a document transmitted to said recipient via said distributed data processing system, said distributed data processing system comprising:
   means for identifying a document for transmittal via said distributed data processing system;
   means for specifying a desired deferral time;
   means for transmitting said identified document and said desired deferral time to a selected recipient within said distributed data processing system;
   means for automatically deferring an attempted response to said identified document from said selected recipient prior to an elapse of said desired deferral time; and
   means for thereafter automatically transmitting said deferred response to said identified document from said selected recipient upon an elapse of said desired deferral time.

10. A method in a distributed data processing system for prompting a response from a selected recipient of a document transmitted via said distributed data processing system, said method comprising the steps of:
   identifying a document for transmittal via said distributed data processing system;
   specifying a desired deferral time for a response to said document by said selected recipient;
   transmitting said identified document and said desired deferral time to said selected recipient within said distributed data processing system; and
   thereafter automatically prompting said selected recipient to respond to said identified document upon an elapse of said specified deferral time.

* * * * *